United States Patent [19]

Tarancon

[11] 4,099,936

[45] Jul. 11, 1978

[54] PROCESS FOR THE PURIFICATION OF SILANE

[75] Inventor: Gregorio Tarancon, Woodbridge, N.J.

[73] Assignee: Union Carbide Corporation, New York, N.Y.

[21] Appl. No.: 751,197

[22] Filed: Dec. 16, 1976

[51] Int. Cl.$^2$ ............................................. B01D 53/02
[52] U.S. Cl. ........................................... 55/75; 55/76; 62/18; 203/41; 203/48; 203/74; 423/347
[58] Field of Search ................. 423/347, 331; 203/41, 203/48, 74; 252/452, 457; 62/18, 24; 55/74, 76, 75

[56] References Cited

U.S. PATENT DOCUMENTS

| | | | |
|---|---|---|---|
| 2,393,625 | 1/1946 | Simons | 252/457 |
| 2,987,139 | 6/1961 | Bush | 55/76 |
| 3,041,141 | 6/1962 | Shoemaker et al. | 423/347 |
| 3,232,702 | 2/1966 | Caswell et al. | 423/347 |
| 3,577,220 | 5/1971 | Kuratomi et al. | 423/347 |

FOREIGN PATENT DOCUMENTS

| | | | |
|---|---|---|---|
| 908,506 | 10/1962 | United Kingdom | 423/347 |

*Primary Examiner*—Wilbur L. Bascomb, Jr.
*Attorney, Agent, or Firm*—Saul R. Bresch

[57] ABSTRACT

A process for the purification of a mixture of silane and impurities comprising passing the mixture through a succession of zones connected in series, in a closed system, according to the following steps:

(a) passing the mixture, in gaseous form, through a zone containing porous, granular charcoal as an adsorbent at a temperature in the range of about minus 40° C to about minus 80° C to provide a mixture of silane and remaining impurities in gaseous form;

(b) passing the gaseous mixture from step (a) through a zone containing porous, granular magnesium silicate as a adsorbent at a temperature in the range of about minus 40° C to about minus 80° C to provide a mixture of silane and remaining impurities in gaseous form;

(c) passing the gaseous mixture from step (b) into a distillation zone in such a manner that the impurities are removed overhead in gaseous form and at least about 95 per cent by weight of the silane is converted to liquid bottoms; and (d) recovering the bottoms.

6 Claims, No Drawings

4,099,936

PROCESS FOR THE PURIFICATION OF SILANE

FIELD OF THE INVENTION

This invention relates to a process for the purification of silane and, more particularly, to a process for purifying silane to the high level of purity required for the production of electronic grade silicon.

DESCRIPTION OF THE PRIOR ART

Silane ($SiH_4$) or silicon hydride is an excellent source for electronic grade silicon, the prerequisite for which is very high purity.

Various modes of minimizing impurities in the silane sources have been proposed such as the use of high purity reactants in the process for the production of silane; closed systems, i.e., systems excluding air and water vapor; and traps and stills of varying degrees of sophistication and complexity. Although these proposals have been successfully utilized over the years, optimization, which might result in the removal of only a few more parts per million (ppm) of impurities, is constantly being sought after to meet industrial demands.

SUMMARY OF THE INVENTION

An object of this invention, therefore, is to provide a process for the purification of silane, which is capable of meeting the highest purity specifications submitted by the electronics industry.

Other objects and advantages will become apparent hereinafter.

According to the present invention such a high purity process has been discovered for the purification of a mixture of silane and impurities comprising passing the mixture through a succession of zones connected in series, in a closed system, according to the following steps:

(a) passing the mixture, in gaseous form, through a zone containing porous, granular charcoal as an adsorbent at a temperature in the range of about minus 40° C to about minus 80° C to provide a mixture of silane and remaining impurities in gaseous form;

(b) passing the gaseous mixture from step (a) through a zone containing porous, granular magnesium silicate as an adsorbent at a temperature in the range of about minus 40° C to about minus 80° C to provide a mixture of silane and remaining impurities in gaseous form;

(c) passing the gaseous mixture from step (b) into a distillation zone in such a manner that the impurities are removed overhead in gaseous form and at least about 95 percent by weight of the silane is converted to liquid bottoms; and (d) recovering the bottoms.

DESCRIPTION OF THE PREFERRED EMBODIMENT

The process utilizes from three to six zones connected in series, the preferred number of zones being six. It can be run as a batch, semi-continuous, or continuous process. The apparatus and other materials used in the process may be made from any of various materials inert to silane and its impurities and capable of withstanding the temperatures and pressures to which the various zones are subjected. Further, the materials should be such that they will not release impurities into the system. Examples of these materials are the stainless steels, e.g., the AISI 304 and 316 stainless steels and alloys containing a major proportion of nickel and a minor proportion of copper. Otherwise, materials and sizing are selected along conventional lines taking into consideration capacities, longevity, economics, and availability.

Typical process silanes which are introduced into subject process for purification contain about 97 percent by weight silane to about 98 percent by weight silane, the balance of the 100 weight percent being impurities. The impurities which the subject process is particularly adapted to remove are hydrogen, chlorosilanes, and silicon tetrachloride, which are present, taken together, in an amount of about of about 1.5 to about 2.5 percent by weight based on the total weight of the mixture of silane and impurities, and other impurities in an amount no greater than about 0.5 percent by weight also based on the total weight of the mixture of silane and impurities. The latter group of impurities are individually measured in parts per million (ppm). Those identified are as follows:

(i) helium
(ii) silicones or siloxanes of indeterminate molecular weight;
(iii) disilane ($H_3Si — SiH_3$) and other combinations of silicon and hydrogen falling under the general heading of silanes (other than $SiH_4$);
(iv) arsine ($AsH_3$);
(v) phosphine ($PH_3$);
(vi) diborane ($B_2H_6$).

The process is carried out in a "closed" system, i.e., it is air tight so that essentially no air or water vapor can get into the system to contaminate the product. This closed system is achieved by conventional sealing techniques. The use of a feed silane with minimal impurities together with the closed system reduces the burden on the purification system and enhances its effectiveness in dealing with trace amounts of impurities.

The purification system may be connected directly to the outlet of a silane production system or to a silane reservoir and the silane mixture (silane + impurities), in gaseous form, passes into the lower portion or about the bottom of a distillation zone and up through the zone. This first zone can be a reflux condenser surrounding a packed column with a pot or other receptacle at the bottom of the column. It is operated in a temperature range of about minus 10° C to about minus minus 70° C and preferably about minus 30° C to about minus 65° C. The pressure is in the range of about 0 pounds per square inch gauge (psig) and about 20 psig and preferably in the range of about 4 psig to about 10 psig. The silicon tetrachloride and part of the chlorosilane are removed here passing down into the pot in liquid form as bottoms or high boilers. The packing in the column is equivalent to about 20 to about 30 theoretical plates. An example of the packing used is chips of metal with holes punched in the chips, each chip being similar to a small colander. Other examples of packing are stainless steel wool and protruded stainless steel. It will be understood that the temperature and pressure in the first zone is such that silane will not be condensed. This is true in the second, third, and sixth zones also where the silane is in the gaseous form. The silane plus the remaining impurities pass overhead to about the bottom of the second zone.

Usually the pipe from the first zone enters the second zone at the top, passes down through the zone, and has its outlet inside and at the bottom of the second zone. The second zone is a trap, usually a column, containing granular, porous charcoal of high surface area. It is operated in a temperature range of about minus 40° C to about minus 80° C and preferably about minus 60° C to about minus 75° C. The operating pressure is usually in the range of about 0 psig to about 10 psig. The charcoal may be activated if desired. The charcoal granules are about 4 to about 40 mesh and preferably about 8 to about 14 mesh (U.S. Sieve Series used throughout) and are the kind typically used for adsorption. The balance (essentially all) of the chlorosilanes, essentially all of the siloxanes, and most of the silicones are adsorbed by the charcoal and removed from the mixture. The silane and the remaining impurities then proceed overhead, in gaseous form, to the third zone in the same manner that the overhead from the first zone passes to the second zone.

The third zone is operated at a temperature in the range of about minus 40° C to about minus 80° C and preferably about minus 60° C to about minus 75° C. The pressure is in the range of about 0 psig to about 20 psig and preferably about 4 psig to about 10 psig. The third zone is also a trap, usually in the form of a column, containing granular, porous magnesium silicate ($MgSiO_4$) as the adsorbent. A preferred magnesium silicate is sold as FLORISIL adsorbent (FLORISIL is a trademark of the Floridin Company of Tallahassee, Florida) and is disclosed in U.S. Pat. No. 2,393,625 issued Jan. 29, 1946, which is incorporated by reference herein. The granules have a high surface area and their mesh size is in the range of about 4 mesh to about 30 mesh and preferably is in the range of about 8 mesh to about 14 mesh. Essentially all of the arsine and phosphine and the balance (essentially all) of the silicones are removed in the third zone. The silane and the remaining impurities then pass, in gaseous form, overhead to a compressor.

The granular materials used as the adsorbent in the second, third, and sixth zones may be used in the granular form per se or combined with conventional packing materials to provide better circulation of the gaseous mixture through the zone.

The compressor is a conventional piece of apparatus having a dual function. It draws the gas in from the third zone by suction using pressures in the range of about 0 psig to about 15 psig and preferably about 4 psig to about 10 psig. It also compresses the gaseous mixture of silane plus remaining impurities. This pressure is in the range of about 20 psig to about 150 psig and is preferably about 40 psig to about 120 psig. The mixture then proceeds to the fourth zone, a distillation zone, where the high pressure is maintained by means of a back pressure regulator, for example. The high pressure together with the conditions in the fourth zone insure that the low boilers will pass overhead in the gaseous form while at least about 95 percent by weight of the above will become liquid bottoms. The fourth zone can be constructed similarly to the first zone, i.e., it can be a reflux condenser surrounding a packed column with a pot or other receptacle at the bottom of the column. The packing is the equivalent of about 20 to about 36 theoretical plates and preferably about 24 to about 30 theoretical plates. Other equivalent forms of stills can be used in this fourth zone as well as the first zone. The fourth zone is operated initially in the range of about minus 50° C to about minus 90° C and preferably about minus 70° C to about minus 80° C. The pressure initially is in the range of about 20 psig to about 150 psig and preferably about 40 psig to about 120 psig. The mixture is usually introduced into the lower half of the packed column preferably at about the tenth theoretical plate and the low boilers, hydrogen and helium, and other unidentified non-condensable inpurities are distilled off overhead as gases. A small amount of silane comes off with these low boilers, about 0.5 to about 5 percent by weight of the total silane entering the zone.

The mixture of low boilers, non-condensables, and the small amount of silane passes overhead in gaseous form from the fourth zone to the fifth zone, which can be an empty column and is maintained in the range of about minus 150° C to about minus 200° C and preferably about minus 185° C to about minus 195° C. The pressure is in the range of about 0 psig to about 5 psig and preferably about 1 psig to about 2 psig. The temperature is sufficient to freeze out the silane, but leave the low boilers and non-condensables in the gaseous state in which form they pass out of the system.

After the low boilers and non-condensables are removed from the fourth zone, the valve which permits gases to flow from the fourth zone to the fifth zone is closed (until the fifth zone operation is completed) and the temperature raised to convert the liquid silane to a gas.

In the same manner, after the low boilers are removed from the fifth zone, the frozen silane is then converted to a gas in the same way as the liquid silane in the fourth zone. The silane gas passes overhead and preferably follows the same path as described for the silane gas from the fourth zone, the common valve then being opened.

The silane with any remaining impurities proceeds from the fourth and fifth zones, in gaseous form, to the sixth zone in the same manner as the mixture passed from the first to second zones and second to third zones.

The sixth zone is similar in structure to the second and third zones and similar in adsorbent content to the second zone. It is operated at a temperature in the range of about minus 10° C to about plus 50° C and preferably about plus 10° C to about plus 30° C. The pressure in the sixth zone is in the range of about 20 psig to about 150 psig and preferably about 40 to about 120 psig. Essentially all of the diborane and silanes other than $SiH_4$ are removed in this zone.

The gaseous silane, which is essentially pure and can be at purity levels of about 99.99+ percent by weight, then passes overhead from the sixth zone to a compressor, which is the same or similar to that described above. The silane is drawn into the compressor by a suction pressure of about 20 psig to about 150 psig and preferably about 40 psig to about 120 psig. The silane gas is then compressed, the discharge pressure being about 1000 psig to about 2000 psig and preferably about 1400 psig to about 1800 psig, in which state it is packaged for distribution to the electronics industry.

The suction function desirably improves the efficiency of the process when utilized after the third and sixth zones; however, other conventional means for driving the gas through the system can also be used.

Although the six zone system, as described, is preferred because highest purities are obtained, the process can be operated with three zones, the second, third, and fourth, and either of the first or sixth zones can be added to the three zones to provide a four zone system.

It will be understood by those skilled in the art that the second and third zones may desirably be operated as one physical unit; however, their separate functions must be maintained as described for the two zones. This may also be done with the fourth and fifth zones.

The preferred order in which the zones function in the system is numerical, i.e., the mixture passes sequentially through zones 1 to 4, part of the mixture in zone 4 goes to zone 5, and then the combined mixtures of zones 4 and 5 go on to the sixth zone. This order may be changed so that the mixture passes sequentially through zones 1, 2, 3, 6, and 4, then part of the mixture in zone 4 goes to zone 5, and the combined mixtures of zones 4 and 5 go on to the compresser for packaging into cylinders; however, the sixth zone temperature will have to be dropped about 20° to 50° C. Temperatures in the zones can be controlled in a conventional manner, a preferred mode being the combination of liquid nitrogen with controlled heating devices.

While the silane purification process described is of general use, it is particularly adapted for a silane having the above-mentioned impurities.

The invention is illustrated by the following example.

EXAMPLE

A mixture of silane plus impurities is passed through the series of six zones (connected in series) described above under the preferred conditions also described above. The system is closed.

The mixture contains:

| Component | Per Cent by Weight of Total Mixture |
|---|---|
| Silane | 98.0 |
| Hydrogen, chlorosilanes, silicon tetrachloride | 1.9 |
| Other impurities as follows: helium silicones siloxanes silanes other than SiH$_4$ arsine phosphine diborane | 0.1 |
| Total | 100.0 |

The charcoal component is activated, the magnesium silicate is FLOROSIL adsorbent and is activated, and the granules are about 8 to about 14 mesh.

The temperatures and pressures maintained in each zone are as follows:

| Zone | ° C | Pressure (psig) |
|---|---|---|
| first | minus 60 | 8 |
| second | minus 70 | 7 |
| third | minus 70 | 6 |
| fourth | minus 75 | 100 |
| fifth | minus 195 | 2 |
| sixth | plus 20° C | 100 |

Only granules are used in the second, third, and sixth zones. The packing used in the first and fifth zones is made of 0.24 inch protruded AISI 316 stainless steel. The number of theoretical plates in the first and fourth zones is 24. All of the apparatus with which the mixture of silane and impurities comes in contact is made from AISI 316 stainless steel. The first and fourth zones are reflux condensers surrounding a packed column with a pot at the bottom; the second, third, and sixth zones are columns containing adsorbent granules; the fifth zone is an empty column. All are equipped to provide and maintain the required temperatures and pressures.

Temperatures in first, second, third, and fourth zones are maintained by liquid nitrogen controlled with heating tape or other heating elements; in the sixth zone with heating tape; and in the fifth zone with liquid nitrogen. Two compressors are used.

The compressor pressure is maintained as follows:
(a) suction from third zone — 5 psig
(b) discharge to fourth zone — 100 psig
(c) suction from sixth zone — 100 psig
(d) discharge for packaging — 1500 psig Analysis of packaged gas from process by gas chromatograph and mass spectroscopy shows silane having a purity of 99.99 percent by weight.

I claim:

1. A process for the purification of a mixture of silane and impurities comprising passing the mixture through a succession of zones connected in series, in a closed system, according to the following steps:
   (a) passing the mixture, in gaseous form, through a zone containing porous, granular charcoal as an adsorbent at a temperature in the range of about minus 40° C to about minus 80° C to provide a mixture of silane and remaining impurities in gaseous form;
   (b) passing the gaseous mixture from step (a) through a zone containing porous, granular magnesium silicate as an adsorbent at a temperature in the range of about minus 40° C to about 80° C to provide a mixture of silane and remaining impurities in gaseous form;
   (c) passing the gaseous mixture from step (b) into a distillation zone in such a manner that the impurities are removed overhead in gaseous form and at least about 95 percent by weight of the silane is converted to liquid bottoms; and
   (d) recovering the silane.

2. The process defined in claim 1 wherein prior to step (a), the mixture is introduced into a distillation zone at a temperature in the range of about minus 10° C to about minus 70° C, and the mixture of silane plus remaining impurities is removed as a gas, which is introduced into step (a).

3. The process defined in claim 1 wherein the bottoms from step (c) are introduced, in gaseous form, into a zone containing porous, granular charcoal as an adsorbent at a temperature in the range of about minus 10° C to about plus 50° C.

4. The process defined in claim 2 wherein the bottoms from step (c) are introduced, in gaseous form, into a zone containing porous, granular charcoal as an adsorbent at a temperature in the range of about minus 10° C to about plus 50° C.

5. The process defined in claim 4 wherein the gaseous mixture of impurities removed in step (c) contains silane and said mixture of impurities is introduced into a zone having a sufficiently low temperature to freeze out the silane.

6. The process defined in claim 5 wherein the temperature in steps (a) and (b) is in the range of about minus 60° C to about minus 75° C.

* * * * *

UNITED STATES PATENT OFFICE
CERTIFICATE OF CORRECTION

Patent No. 4,099,936            Dated    July 11, 1978

Inventor(s)  Gregorio Tarancon

It is certified that error appears in the above-identified patent and that said Letters Patent are hereby corrected as shown below:

Column 6, line 30, before "80°C," insert -- minus --.

Signed and Sealed this

Twenty-sixth Day of December 1978

[SEAL]

Attest:

RUTH C. MASON
Attesting Officer

DONALD W. BANNER
Commissioner of Patents and Trademarks